(12) United States Patent
Zhong et al.

(10) Patent No.: US 8,037,003 B2
(45) Date of Patent: Oct. 11, 2011

(54) SOLUTION RECOMMENDATION BASED ON INCOMPLETE DATA SETS

(75) Inventors: Ming Zhong, Sunnyvale, CA (US); Tong Sun, Penfield, NY (US); Michael D. Shepherd, Ontario, NY (US); Alan T. Cote, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 749 days.

(21) Appl. No.: 12/173,040

(22) Filed: Jul. 15, 2008

(65) Prior Publication Data

US 2008/0275834 A1 Nov. 6, 2008

Related U.S. Application Data

(63) Continuation-in-part of application No. 11/342,755, filed on Jan. 30, 2006, now Pat. No. 7,415,449.

(51) Int. Cl.
*G06F 17/00* (2006.01)
*G06N 5/02* (2006.01)

(52) U.S. Cl. ............................... 706/46; 706/47; 706/61

(58) Field of Classification Search ........................ None
See application file for complete search history.

(56) References Cited

U.S. PATENT DOCUMENTS

| | | | |
|---|---|---|---|
| 5,278,980 A | 1/1994 | Pedersen | |
| 5,704,017 A | 12/1997 | Heckerman | |
| 5,724,567 A | 3/1998 | Rose | |
| 5,790,426 A | 8/1998 | Robinson | |
| 5,790,935 A | 8/1998 | Payton | |
| 5,867,799 A | 2/1999 | Lang | |
| 5,884,282 A | 3/1999 | Robinson | |
| 5,909,227 A | 6/1999 | Silverbrook | |
| 5,918,014 A | 6/1999 | Robinson | |
| 5,983,214 A | 11/1999 | Lang | |
| 5,984,446 A | 11/1999 | Silverbrook | |
| 6,006,218 A | 12/1999 | Breese | |
| 6,029,141 A | 2/2000 | Bezos | |
| 6,029,195 A | 2/2000 | Herz | |
| 6,041,311 A | 3/2000 | Chislenko | |
| 6,049,777 A | 4/2000 | Sheena | |
| 6,064,980 A | 5/2000 | Jacobi | |
| 6,072,942 A | 6/2000 | Stockwell | |
| 6,078,740 A | 6/2000 | DeTreville | |
| 6,138,116 A | 10/2000 | Kitagawa | |
| 6,493,702 B1 | 12/2002 | Adar | |
| 6,510,406 B1 | 1/2003 | Marchisio | |
| 6,633,890 B1 | 10/2003 | Laverty et al. | |
| 6,687,696 B2 | 2/2004 | Hofmann | |
| 6,786,565 B2 | 9/2004 | Pinard et al. | |

(Continued)

OTHER PUBLICATIONS

Zhong et al., M., "A Printing Workflow Recommendation Tool—Exploiting Correlations between Highly Sparse Case Logs", IEEE, Proceedings of the 5th International Conference on Machine Learning and Applications, pp. 1-6, 2006.*

(Continued)

*Primary Examiner* — Jeffrey A Gaffin
*Assistant Examiner* — Adrian Kennedy
(74) *Attorney, Agent, or Firm* — Fay Sharpe LLP (57) ABSTRACT

In accordance with one aspect of the present exemplary embodiment, a system determines a solution based on received data. An intake component receives an incomplete data set from one or more sources. A recommendation system transforms the incomplete data set into a semantic data set via latent semantic indexing, classifies the semantic data set into an existing cluster and provides one or more solutions of the existing cluster as one or more recommendations.

11 Claims, 4 Drawing Sheets

U.S. PATENT DOCUMENTS

| | | |
|---|---|---|
| 6,850,252 B1 | 2/2005 | Hoffberg |
| 6,903,839 B1 | 6/2005 | Laverty et al. |
| 6,916,078 B2 | 7/2005 | Pinard et al. |

OTHER PUBLICATIONS

Eder et al., J., "Workflow Recovery", IEEE, 11 pages, 1996.*

Bradley, P.S. and Fayyad, U.M., Refining Initial Points for K-Means Clustering; *Proc. of the 15th International Conference on Machine Learning* (ICML 1998), pp. 91-99. 1998.

Duda, R.O., Hart, P.E., and Stork, D. G., "Pattern Classification and Scene Analysis ($2^{nd}$ ed.) Part 1: Pattern Classification", 1995 ($1^{st}$ Edition Book—John Wiley and Sons, 1973.).

Fukunaga, K., "Introduction to Statistical Pattern Recognition", Academic Press, pp. 1-31. 1990.

Goldberg, D., Nichols, D., Oki, B.M., Terry, D., "Using collaborative filtering to weave an information tapestry", *Communications of the ACM*, vol. 35 (12), pp. 61-70, Dec. 1992.

Pelleg, D., Moore, A., *X*-means: Extending *K*-means with Efficient Estimation of the Number of Clusters; *Proc. $17^{th}$ International Conf. on Machine Learning*, pp. 727-734. 2000.

Patterson, Ozbayrak, Papadopoulou, "Simulation of JIT performance in a printing shop". Proc. of the 2002 Winter Simulation Conference; vol. 2, Dec. 8-11, 2002, pp. 1914-1921, Digital Object Identifier 10.1109/WSC.2002.1166490.

Dongarra et al., "Distribution of Mathematical Software Via Electronic Mail", 1987.

Schoner, H., "Working with Real-World Datasets", Ph.D. Thesis, Berlin University of Technology, 2004.

Schwarz, G., "Estimating the Dimension of a Model", *The Annals of Statistics*, vol. 6, No. 2, pp. 461-464, 1978.

Berry et al., "Using Lenear Algebra for Intelligent Information Retrieval", 1994.

Oliver et al., "SWISH: Semantic Analysis of Window Titles and Switching History", 2002.

* cited by examiner

SOLUTION RECOMMENDATION BASED ON INCOMPLETE DATA SETS

CROSS REFERENCE TO RELATED PATENTS AND APPLICATIONS

This is a continuation-in-part of application of U.S. Ser. No. 11/342,755 filed Jan. 30, 2006, entitled "Solution Recommendation Based on Incomplete Data Sets," by Ming Zhong, et al., the disclosure of which is hereby incorporated by reference in its entirety.

BACKGROUND

The following relates to recommendation systems. It finds particular application in recommendation systems utilizing missing value projections provided via latent semantic indexing techniques.

In one application, a web-based tool allows a user to enter a customer's information and associated workflow requirements and/or constraints through a dynamic questionnaire process. A set of workflow configurations that possibly satisfy the customer's requirements are auto-generated. Finally, the customer will choose the most suitable one among the auto-generated workflows.

In one approach, the customer's constraints, the generated workflows, and final customer choice are recorded by the tool as a "case log" which can be identified by a unique case identification code and stored in the case database. Based on these collected case logs, a production printing workflow recommendation system can provide new incoming cases with suggested workflow configurations. The workflow recommendation system can discover hidden knowledge from existing case logs to enhance the core knowledge model and questionnaires of the workflow generation tool. In addition, the workflow recommendation system can significantly improve the efficiency and accuracy of current workflow generation tools by narrowing down the workflow search scope for new cases that are similar to existing ones.

However, there are several drawbacks to this approach. The major difficulty of designing a workflow recommendation system is due to the high incompleteness of data received. In some instance, many case constraints have missing values because of customers' laziness or incapability to answer constraint related questions. Most reported approaches of dealing with data incompleteness (e.g., mean/median estimation, regression, interpolation, etc.) fall into the category of missing value prediction. However, missing value prediction techniques are limited in that they achieve adequate performance only under scenarios with only a few missing values and hence are not suitable for applications where a large number of constraints have missing values.

Another approach, collaborative filtering, is also adopted by some recommendation systems to predict the missing recommendation scores of customers towards different products. This technique focuses only on recommendation score prediction and is not directly applicable for customer constraints (e.g., requirements) prediction needed in such applications.

In order to remedy this problem, alternative systems and methods need to be employed to provide accurate and useful recommendations based on incomplete data sets.

BRIEF DESCRIPTION

In one aspect, a system determines a solution based on received data. An intake component receives an incomplete data set from one or more sources. A recommendation system transforms the incomplete data set into a semantic data set via latent semantic indexing, classifies the semantic data set into an existing cluster and provides one or more solutions of the existing cluster as one or more recommendations.

In another aspect, a method provides at least one solution based at least in part upon data received. At least one data set is received and mapped into one or more vectors based at least in part on one or more attribute values and importance associated therewith. The one or more vectors are placed into a term-document matrix. The term-document matrix is decomposed via a latent semantic indexing transformation matrix to eliminate excessive data from the term-document matrix such that only relevant data remains, wherein hidden semantic categories are recognized. Clusters associated with the hidden semantic categories are identified.

In yet another aspect, a method provides representative workflows based at least in part upon one or more case logs. A new case is mapped into a vector in a case constraint space to produce a case log vector and a latent semantic indexing transformation matrix is utilized to map the case log vector into a semantic vector with reduced dimensionality. The semantic vector is classified into a particular case cluster, which is determined by the case cluster whose cluster centroid vector has the largest cosine product with the semantic vector. The representative workflow of the particular case cluster is returned as one or more recommended workflow solutions. The confidence score is calculated and output for the one or more recommended workflow solutions.

DETAILED DESCRIPTION

Figure 1:
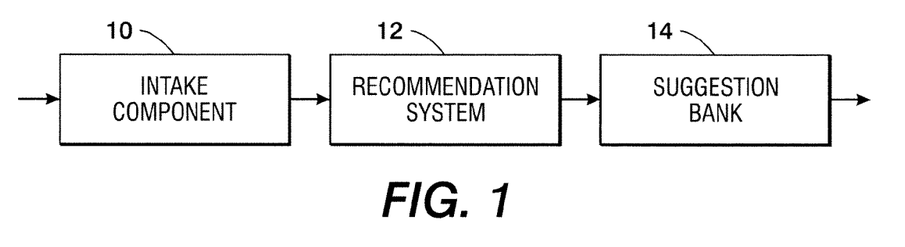
FIG. 1 illustrates a system that provides a solution via a recommendation system based on received user data.

With reference to FIG. 1, a system is illustrated that provides suggestions to a user that includes an intake component 10, a recommendation system 12, and a solution bank 14. This system can discover (e.g., via data mining) hidden case clusters from incomplete data sets (e.g., case logs). The problem of data incompleteness can be addressed by utilizing one or more techniques such as latent semantic indexing (LSI) under the guide of a domain model for customer constraints (e.g., requirements). LSI can eliminate noise caused by constraint dependencies and transform original case logs into case logs with semantic constraints. In one example, each semantic constraint can represent a number of real constraints with hidden conceptual correlations.

The intake component 10 can receive one or more data sets from one or more sources. In one example, a source provides data acquired from a questionnaire or equivalent that queries a user to provide information related to one or more topics.

For instance, a user (e.g., current client, potential client, etc.) can be asked to provide information related to workflows that exist in their work environment. Such workflows can be related to the manner in which a user manufactures a product, provides goods or services to a client, manages internal resources, etc. In one example, a workflow defines a process that is automated by at least one automation device.

Recommendation systems are programs which attempt to predict items (e.g., movies, music, books, news, web pages, etc.) that a user may be interested in, given some information about the user's profile. Often, this is implemented as a collaborative filtering algorithm. Typically, recommendation systems work by collecting data from users, using a combination of explicit and implicit methods.

Explicit data collection can be employed in several scenarios. In one example, a user is asked to rate an item on a sliding scale. In another example, a user is asked to rank a collection of items from favorite to least favorite. In yet another example, a user is asked to create a list of items that they like. In contrast, implicit data collection systems can utilize less overt means to obtain data, for example, by observing the items a user views in an online store, keeping a record of items that a user purchases online, etc.

The recommendation system compares the collected data to similar data collected from others and calculates a list of the recommended items for the user. Recommendation systems are a useful alternative to search algorithms since they help user discover items they might not have found by themselves.

Workflows generally employ one or more pieces of equipment to automate one or more processes. In this manner, resources (e.g., personnel, time, money, etc.) can be more efficiently utilized. A manufacturer of goods and/or services employed to automate processes can utilize one or more diagnostic tools, e.g., software application, web interfaces, questionnaires, and the like to extract information from a user (e.g., current client, potential client, etc.). Such information can be helpful to assess the goods and/or services such a user may utilize to enhance the efficiency of their workflows.

In order to diagnose a user's needs, a series of questions can be posed to scrutinize one or more aspects of production. Such questions can relate to color requirements, media characteristics, print volume, printer speed, finishing characteristics, desired or current manufacturing output, capacity, etc. In addition, a user can be asked to provide the name, model, make, manufacturer, etc. of goods and/or services currently in use. In one example, information can be elicited from a user via queries by one or more personnel, a web application, a direct mailing, etc. to determine one or more appropriate solutions to a user's needs.

Typically, a user does not provide all requested information to the interrogating party. Thus, in order to provide a complete data set, the interrogating party must attempt to predict user responses to determine one or more appropriate solutions to a user need. Such needs may be overtly known to the user and/or implicit in the user's responses.

The intake component 10 can receive, organize, assemble, parse, etc. data received from the one or more sources. In one aspect, data can be transmitted as a series of constraints, wherein each constraint is related to one or more queries posed to the user. The intake component 10 can utilize a database or equivalent to assemble data from each disparate user into one or more common constraint fields. In one example, a value is assigned to a query wherein the corresponding constraint provided by the user is located and placed in a database to provide to the recommendation system 12. In cases where a constraint is not provided in response to a query, the intake component 10 can assign a value (e.g., zero, "xxx," etc.) to the constraint field when processing the incoming data.

The recommendation system 12 can assess data that is associated with one or more users. In one example, such data assessment can be employed to provide one or more user response predictions. Such predictions can provide a more comprehensive data set that can be employed to provide a more appropriate solution based upon such predictions. In one approach, predictions are based at least in part upon data from one or disparate users. In this manner, data from previously collected user constraints can be leveraged to determine current and future user constraints. This information can then be employed to provide a more complete profile of a user and thus a more accurate solution to the user.

The recommendation system 12 can employ one or more algorithms to analyze data received from the intake component 10 to predict one or more appropriate user solution that are stored in the solution bank 14 and can be presented therefrom. Such analysis can be performed via one or more algorithms. In one example, a domain model guided Latent Semantic Indexing (LSI) algorithm is utilized to handle data incompleteness. Although LSI is a technique utilized in text mining, it has not been used to address the problem of data incompleteness in recommendation systems.

Under the guide of the domain model, LSI can be utilized to eliminate noise caused by constraint dependencies and to transform original received data into data with semantic constraints. In one example, data is received in the form of a case log which is representative of one or more user requirements. Following this example, each semantic constraint can represent a number of real constraints with hidden conceptual correlations. The generation process of semantic constraints can circumvent the problem of missing value prediction by folding multiple conceptually correlated constraints into one semantic constraint, whose value can be estimated as the LSI summary of the values of its represented constraints.

Case clusters are discovered among the above generated semantic case logs in a self-guided, adaptive way (i.e., no prior knowledge on cluster patterns or the number of clusters is needed) and make workflow suggestions accordingly. Specifically, semantic case logs and their associated workflows are clustered into groups by using refined a K-means algorithm or the like. For each cluster, some "representative" workflow configurations (e.g., the top popular workflows) are retrieved by direct statistics. A new case will be first transformed into a semantic case by LSI, then classified into an existing cluster, and finally receive the typical workflow solutions of that cluster as recommendations. Note that a new case's constraints and associated workflows will also be recorded into system database, which periodically performs case clustering to keep our case clusters up-to-date.

Figure 2:
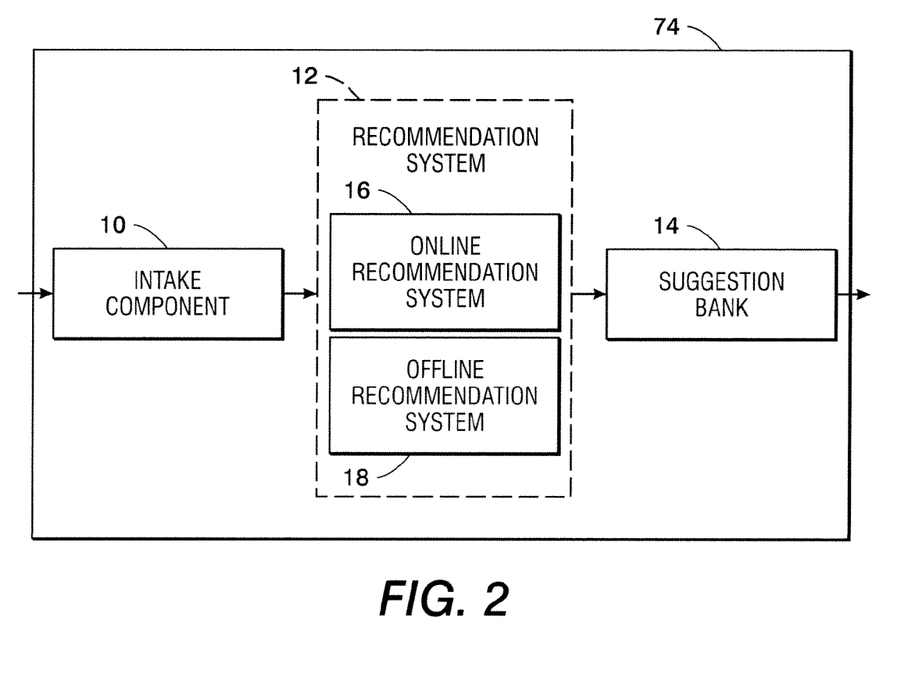
FIG. 2 illustrates the system of FIG. 1 wherein the recommendation system utilizes an online and offline recommendation system.

FIG. 2 shows the system illustrated in FIG. 1 wherein the recommendation system 12 includes an online recommendation system 16 and an offline recommendation system 18. The online recommendation system 16 can execute online when the intake component transmits new data (e.g., one or more case logs) to the online recommendation system 16 that is received from one or more sources. Upon execution, the online recommendation system 16 can run one or more routines, processes, etc. to compare the received data to one or more predefined case clusters. A case cluster can be representative of one or more semantic values that have similar semantic values.

In one example, the online recommendation system 16 can employ LSI to determine the similarity of semantic data values within one or more received case logs to previously received data. In this manner, new data can be correlated to a data cluster. Each cluster can be associated with one or more suggestions to appropriately respond to the received data. In this manner, previously received data can be leveraged to provide one or more recommended solutions that are representative of that cluster. Since the clusters are pre-classified, runtime overhead expenses, resources, time, etc. can be reduced and more appropriate solution provided to the user.

The offline recommendation system 18 supports the on-line recommendation systems by discovering hidden patterns/clusters from previously received data (e.g., case logs). The previously received case logs are first mapped into vectors based on the attribute values and importance of each attribute. After the vectorization of case logs, they are placed in a term-document matrix which can be decomposed by utilizing LSI transformation matrix. In this manner, the excessive data (e.g., noise) can be eliminated from the original term-document matrix such that only relevant data remains. Thus, the hidden semantic data categories become recognizable and their associated clusters can be identified.

Once this data processing is complete, the vectors are correlated to a particular data cluster. Each data cluster can be associated with one or more representative solutions to a user need. Such solutions can be organized and presented to a user based on any number of metrics such as popularity, success, total throughput, resources employed, cost, etc. The offline recommendation system 18 can be executed on a periodic basis, based on need, when a condition is met, etc. In addition, each solution can be associated with a confidence level based on previous successfulness of the solution.

Figure 3:
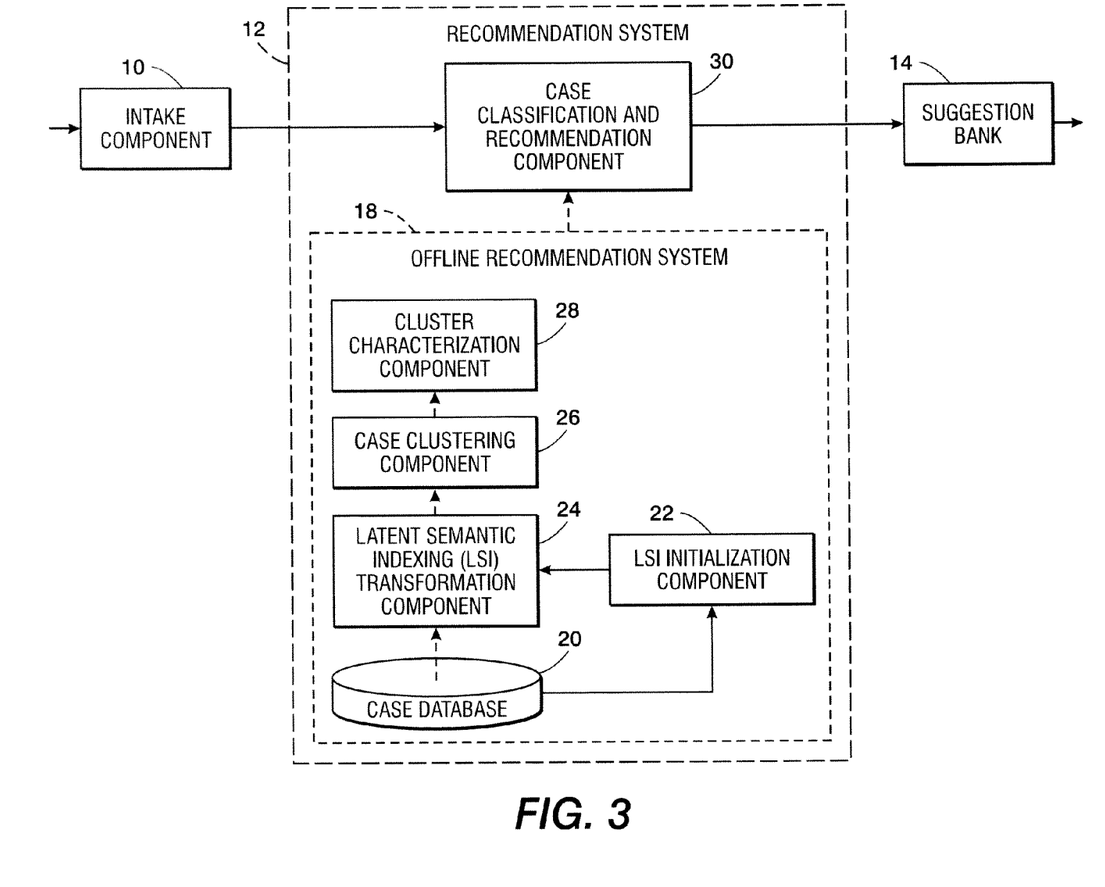
FIG. 3 illustrates the recommendation system wherein specific components perform particular functions to provide one or more solutions.
Figure 4:
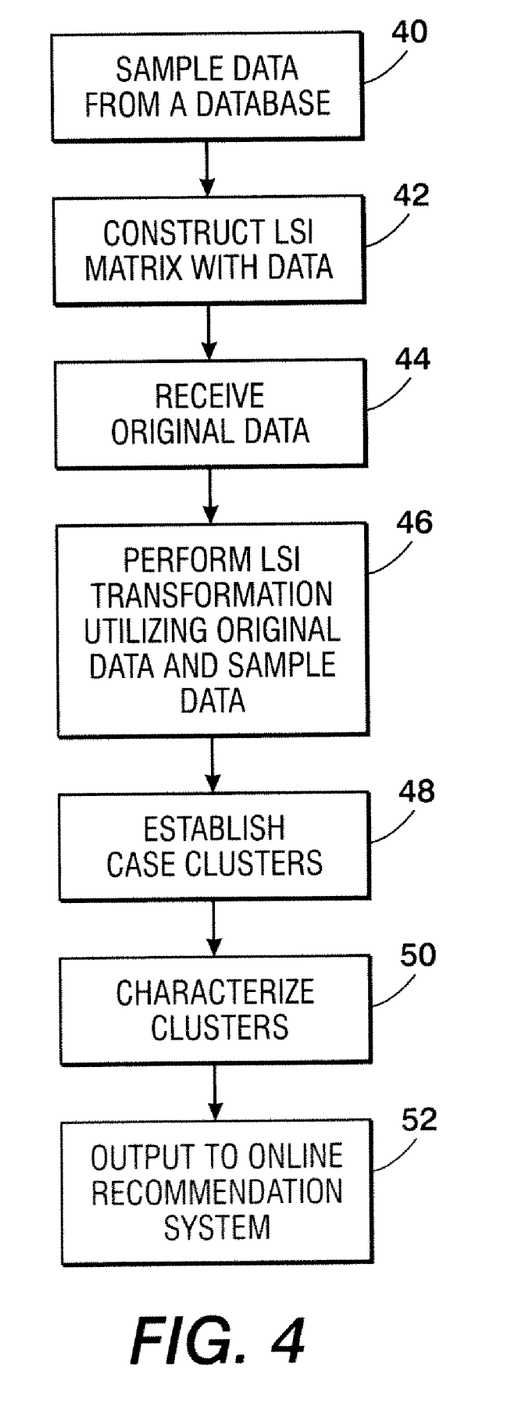
FIG. 4 illustrates a methodology to establish one or more case clusters and determine their one or more representative solutions.

FIG. 3 illustrates a recommendation system that includes the intake component 10, the recommendation system 12, and the solution bank 14. The recommendation system further includes the online recommendation system 16 and the offline recommendation system 18. The online recommendation system 16 utilizes a case classification and recommendation component 30 to provide solutions to a user online. The offline recommendation system 18 includes a case database 20, a LSI initialization component 22, a LSI transformation component 24, a case clustering component 26, and a cluster characterization component 28.

The case database 20 receives data from the intake component that relates to all incoming data. The case database 20 maintains the records of previous cases, where each record includes customer constraints and the generated and interested workflow. For each incoming case, its customer preferences are collected via pre-defined customer questionnaires. Here we assume that customer answers to the questionnaire are complete. The generated workflow(s) can be the outcome of an auto-generation scheme, and the interested workflow(s) is the final customer choice out of generated workflows, which are provided either by our recommendation system or by existing workflow generation systems. A typical record contained in the case database 20 is as follows:

weight. Unlike numerical case attributes (e.g., printing speed), categorical case constraint attributes (e.g., case zones, multiple choice service properties) cannot be directly mapped into numerical point coordinates since they are typically unordered. To address this issue, an m-choice categorical attribute can be mapped into m categorical point coordinates, where m is an integer greater than or equal to 0. Each coordinate can correspond to one category and take a non-zero value exactly when its corresponding category is chosen by the user.

After the vectorization of case logs, data can be transmitted to the LSI transformation component 24 in the form of d randomly sampled case logs will be represented by a t×d matrix M, where each column vector is the vector corresponding to the j th case log. In this example, M can be a two dimensional "term-document" matrix, wherein t is a "term" axis and d is a "document" (e.g., case log) axis in the M matrix. In this manner, terms contained in each case log can be correlated to one another.

Let r be the rank of M, then the Singular Value Decomposition (SVD) of M is $M=T \times S \times D'$, where T (a t×r matrix) and D (a d×r matrix) have orthonormal column vectors and S is a diagonal matrix with singular values ranked in a descending order. Let $T_k, S_k, D_k$ be the resulted matrices by keeping only the first k columns of T, S, D, where k should be the number of semantic concepts in the case logs. A case log vector x could be folded into the k-dimensional semantic space by $x_k = x \times T_k$, which maps x, a t-dimensional case log vector, into $x_k$, a k-dimensional semantic case log vector.

The case clustering component 26 clusters semantic case log vectors into groups based on their mutual correlations. Such a clustering algorithm can partition the points into groups such that the points within each group tend to have much higher correlations with each other than with outside points, where the correlations between two points can be well captured by the distance between them. Let the total number of case log vectors be n. Let the maximum number of case clusters be $K_{max}$. The following can be representative of the framework of an algorithm to generate one or more clustering schemes:

1. FOR K=1 TO $K._{max}$
   a. Cluster n vectors into K clusters by using K-means algorithm with refined initial centroids.
   b. Evaluate the performance of the K clusters by Bayesian Information Criterion (BIC) scores.
   c. Store the above K cluster centroids and their evaluation score as a clustering scheme.
   END
2. Return the clustering scheme with the best evaluation score.

This algorithm can be employed to generate clustering schemes for all possible values of K, the number of case clusters, and finally to return the overall best clustering

| Color requirements | Media Characteristics | Print Volume | Printer Speed | Finishing Characteristics | ... | ... | Generated Workflows | Interested workflows |
|---|---|---|---|---|---|---|---|---|

The LSI initialization component 22 can be employed to setup an LSI transformation matrix. The first step is to map case logs into vectors based on the attribute values and the importance of each attribute. Specifically, the point coordinate corresponding to a numerical constraint attribute value is defined as the multiplication between the normalized attribute value and the predefined attribute importance scheme in terms of Bayesian Information Criterion (BIC) evaluation scores. Hence, this algorithm can discover both the actual number of case clusters and the corresponding clusters.

In Step 1a above, the clustering algorithm is motivated by the standard K-means algorithm and its refined versions. Let A be a small constant. Our clustering algorithm is as follows.

Input: n vectors.
Output: K cluster centroid vectors.
Algorithm:
FOR i=1 TO R
   1. Cluster n input vectors into K clusters by using K-means algorithm as follows.
      A) Randomly choose K initial vectors and set them as K initial centroid vectors.
      B) For each vector x of the n input vectors, associate it with the centroid vector with the largest cosine product.
      C) Update each centroid vector by taking the average of all vectors associated with this centroid vector.
      D) Keep running the above
   2 steps until centroid vectors do not change. 2. Store the above-computed K cluster centroids in $C_i$, a K-vector data structure.
   3. Evaluate the total distortion score for $C_i$ by computing the sum of the cosine products between each input vector and its associated centroid vector.
END
Return $C_i$ with the lowest total distortion score.

A K-means algorithm converges to a local minimum in terms of global distortion metrics (the average distortion between a vector and its cluster centroid). The convergence of a K-means algorithm is deterministic and independent of the choice of initial centroid vectors. However, a bad choice of initial vectors can greatly affect the distortion of final clusters since the clusters may end up trapped in a bad local minimum. In order to address this problem, a K-means algorithm can be executed with R random sets of initial centroid vectors and a clustering scheme with the overall minimum distortion can be selected. It is to be appreciated that a K-clustering scheme is returned as K cluster centroid vectors, which associates an input vector to the centroid vector with the largest cosine product.

In Step 1b above, the K-clustering scheme $C_i$ computed in Step 1a is evaluated by BIC scores, which gives the posterior probability of the input points. Motivated by the cluster evaluation work in, a BIC score can be defined as follows:

$$BIC(C_i) = 2L(C_i) - n\text{par} \cdot \log n.$$

Here, $L(C_i)$ is the posterior log-likelihood of $C_i$. Npar, the number of parameters in our model, is Km here since there are K centroids with m coordinates for each.

The estimate of $L(C_i)$ depends on the underlying cluster probability model. If it is assumed that the vectors of each cluster satisfy m-dimensional Gaussian distribution, then the mean value $\mu_i$ and variance $\sigma_i$ of the i th cluster's probability distribution are known since $\mu_i$ is the centroid of the cluster and $\sigma_i$ can be easily estimated based on the cosine product between the centroid and all vectors of the cluster. Hence, $L_i$ can be computed based on cluster probability distributions and input vectors. Specifically, if $n_i$ denote the number of vectors in the i th cluster, then $$L(C_i) = \sum_{j=1}^{K} \left[ -\frac{n_j}{2}\log(2\pi) - \frac{n_j \cdot m}{2}\log(\sigma_j^2) - \frac{n_j - K}{2} + n_j \cdot \log n_j - n_j \cdot \log n \right].$$

In Step 2, the clustering scheme with the maximal BIC score is returned as the list of cluster centroid vectors.

The cluster characterization component 28 can calculate the representative workflows for each cluster in the final clustering scheme generated by the case clustering component 26. The representative workflows can include any workflow that is interesting to customers, e.g., the most popular workflow based upon any number of factors such as cost, capacity, throughput, etc.

In this embodiment, the online recommendation system 16 includes the case classification and recommendation component (CCRC) 30. The CCRC 30 can be executed upon the arrival of incoming case data to the recommendation system 12. In one approach, the following process is employed:
   1. Map a new case into a vector in the case constraint space.
   2. Use the LSI transformation matrix to map the above case log vector into a semantic vector with reduced dimensionality.
   3. Classify the above semantic vector into an existing case cluster whose cluster centroid vector has the largest cosine product with the semantic vector.
   4. Return the representative workflows of that cluster as the recommended workflow solutions.
   5. Calculate and output the confidence score for the recommendations just made.

If the semantic vector corresponding to the incoming case is x, the associated cluster centroid vector of x is c(x), and d(x, y) denotes the cosine product between vector x and y in the semantic constraint space, then the confidence score is defined as follows:

$$\text{Score}(x) = \frac{1 + d(x, c(x))}{2}$$

Depending on the cosine product between the semantic vector related to the incoming case and its associated cluster centroid vector, the confidence scores ranges from 0 to 1, where 1 represents the maximal confidence (when d(x,c(x))=1 or x=c(x)) and 0 represents the minimal confidence (when d(x,c(x))=−1 or x=−c(x)). In this embodiment, the confidence score is based on a logarithmic scale. However, it is to be appreciated that substantially any scale can be employed such as a linear, an exponential, etc.

The intake component 10, recommendation system 12 and/or the suggestion bank 14, can be utilized within a computer 74, as provided in FIG. 2. The computer 74 may include a processing unit, a system memory, and a system bus that couples various system components including the system memory to the processing unit (none shown). The processing unit may be any of various commercially available processors. Dual microprocessors and other multi-processor architectures also can be used as the processing unit.

The system bus may be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer 74, such as during start-up, is stored in ROM.

The computer 74 may further include a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The computer 74 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer 74 through a keyboard and a pointing device, such as a mouse. Other input devices may include a microphone, an IR remote control, a joystick, a game pad, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, etc. A monitor, or other type of display device, is also connected to the system bus via an interface, such as a video adapter. In addition to the monitor, a computer typically includes other peripheral output devices (not shown), such as speakers, printers etc.

The computer 74 may operate in a networked environment using logical and/or physical connections to one or more remote computers, such as a remote computer(s). The remote computer(s) may be a workstation, a server computer, a router, a personal computer, microprocessor based entertainment appliance, a peer device or other common network node, and typically includes many or all of the elements described relative to the computer, although, for purposes of brevity, only a memory storage device is illustrated. The logical connections depicted include a local area network (LAN) and a wide area network (WAN). Such networking environments are commonplace in offices, enterprise-wide computer networks, intranets and the Internet.

When used in a LAN networking environment, the computer 74 is connected to the local network through a network interface or adapter. When used in a WAN networking environment, the computer typically includes a modem, or is connected to a communications server on the LAN, or has other means for establishing communications over the WAN, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing a communications link between the computers may be used.

Figure 5:
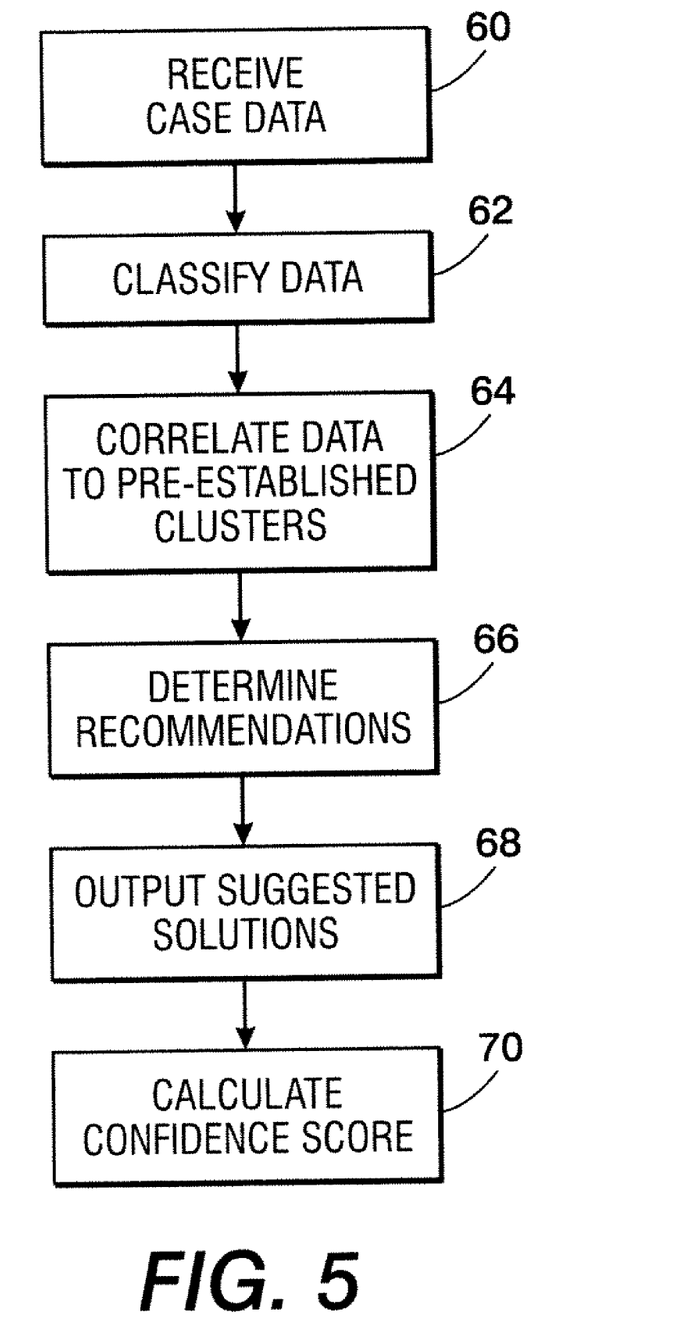
FIG. 5 illustrates a methodology that correlates received case data to a pre-established cluster and provides one or solution associated therewith.

While, for purposes of simplicity of explanation, the methodologies of FIGS. 5 and 6 are shown and described as executing serially, it is to be understood and appreciated that the exemplary embodiment is not limited by the illustrated order, as some aspects could, in accordance with the exemplary embodiment, occur in different orders and/or concurrently with other aspects from that shown and described herein. Moreover, not all illustrated features may be required to implement a methodology in accordance with an aspect of the exemplary embodiment.

FIG. 5 illustrates a methodology to establish one or more case clusters and determine their one or more representative solutions. At reference numeral 40, at least one data set (e.g., sample data from a database) is received. In one embodiment, the data can be in the form of case logs which are representative of current and/or potential customer requirements. Such requirements can be gathered via one or more means such as verbal interrogation, written questionnaire, web application, etc. and subsequently placed into the database. At 42, the at least one data set is mapped into one or more vectors. The data set can contain one or more language documents and/or fields. In one example, mapping can occur based on the attribute values and the importance of each attribute. At 44, the one or more vectors are placed into a term-document matrix. In this manner, the language documents can be represented as mathematical objects to allow processing of the objects as a whole. Such term-document matrix can allow data to be organized such that relationships between vectors can be located and identified.

At 46, the term-document matrix is decomposed to determine semantic categories. Decomposition of the matrix can be accomplished utilizing a known process such as singular value decomposition, for example. The result of such decomposition can be a plurality of semantic categories. At 48, one or more clusters associated with the semantic categories are identified. In one example, a clustering algorithm, as employed by the case clustering component 26 above, can be utilized to cluster the semantic data vectors. In addition, clusters can be characterized such that each cluster correlates to one or more representative solutions. In one example, a solution is provided as a workflow. Representative workflows can be calculated for each cluster in the final clustering scheme after case clusters have been established. The representative workflows can include any workflow that can be organized and presented based on one or more factors such as popularity, confidence level, cost, capacity, throughput, etc.

At 50, the clusters and representative solutions are output to one or more recipients. In one example, the recipient is an online component that can utilize such data to provide one or more solutions to a user based upon data representative of one or more current requirements. The online component can correlate the user requirements to a cluster that closely resembles the semantic values of the user. In addition, a list of representative solutions can be provided.

FIG. 6 illustrates a methodology that correlates received case data to a pre-established cluster and provides one or more solutions associated therewith. At 60, case data is received. Such data can be acquired from one or more users to determine their business requirements. For example, a user's manufacturing requirements, logistics, budget, resources, etc. can be gathered and assembled into a case log for analysis. At 62, received case data is vectorized. In one example, data is vectorized by mapping it into a vector in a case constraint space. At 64, the vectorized data is correlated to one or more pre-established clusters. In one approach, an LSI transformation matrix can be employed to map the case log vector into a semantic vector with reduced dimensionality. In this process, data that is closely semantically related can be decomposed to reveal case data similarity or differences with a pre-established cluster.

At 66, hidden knowledge within the vectorized case data is discovered. This discovery can be based at least in part upon the one or more pre-established clusters. At 68, recommended solutions are output to one or more recipients. Such solutions can be acquired quickly with a low amount of overhead since the majority of the computation to classify, transform and cluster data is done offline. In one example, solutions can be presented to the user based on one or more metrics.

At 70, the confidence score of the recommended solutions is calculated. In one approach, the confidence score can be representative of whether the online solution is the same as the solution calculated offline. In one example, the formula employed by the CCRC component 30 can be employed to determine the confidence score between a value of 0 and 1. In this example, 0 represents a minimal confidence score and 1 is a maximal confidence score.

It will be appreciated that variations of the above-disclosed and other features and functions, or alternatives thereof, may be desirably combined into many other different systems or applications. Various and variant embodiments presently unforeseen or unanticipated alternatives, modifications, variations or improvements therein may be subsequently made by those skilled in the art which are also intended to be encompassed by the following claims. In addition, the claims can encompass embodiments in hardware, software, or a combination thereof.

The invention claimed is:

1. A computer based system that identifies one or more workflows for a print process, comprising:
    an intake component that receives an incomplete data set from one or more sources, wherein the incomplete data set is related to a production workflow for a print process;
    a case classification and recommendation component that maps the incomplete data set into a case log vector in a case constraint space, utilizes a latent semantic index transformation to map the case log vector into a semantic vector with reduced dimensionality, classifies the semantic vector into an existing case cluster whose cluster centroid vector has the largest cosine product with the semantic vector, and returns one or more representative workflows of the existing case cluster as one or more recommended workflow solutions;
    at least one predefined cluster that is created by mapping previously collected data into one or more data vectors, mapping the one or more data vectors into one or more semantic data vectors and clustering the one or more semantic data vectors into at least one group based at least in part upon one or more mutual correlations, wherein the each of the at least one cluster is associated with at least one solution; and
    an online recommendation system that provides one or more solutions via correlation of the incomplete data set to one or more predefined data clusters, wherein the solution is a workflow that completely defines a print process automated by at least one automation device.

2. The computer based system according to claim 1, further including a solution bank that stores and presents the one or more recommended solutions.

3. The computer based system according to claim 1, wherein the incomplete data set is at least one case log that contains one or more user constraints that relate to one or more user requirements.

4. The computer based system according to claim 1, wherein the recommendation system further includes an offline recommendation system that receives data from a database and clusters the data into groups based on their mutual correlation, wherein each cluster is associated with one or more recommended solutions.

5. The computer based system according to claim 1, wherein the one or more recommended workflow solutions are assigned a confidence score, wherein the confidence score is defined as Score $$(x) = \frac{1 + d(x, c(x))}{2},$$

wherein the semantic vector corresponding to the incoming case is x, the associated cluster centroid vector of x is c(x), and the cosine product between vector x and y in the semantic constraint space is d(x, y).

6. The computer based system according to claim 5, wherein the confidence score indicates the cosine product between the semantic vector related to the incoming case and its associated centroid vector, wherein 0 represents the minimal confidence when $d(x,c(x))=-1$ or $x=-c(x)$ and 1 represents the maximal confidence when $d(x,c(x))=1$ or $x=c(x)$.

7. The computer based system according to claim 1, further including a case database that stores at least one record of at least one previous case, wherein the at least one record includes one or more customer constraints, at least one generated workflow and at least one interested workflow, wherein the at least one generated workflow is provided by the recommendation system and the at least one interested workflow is selected from one of the generated workflows.

8. The computer based system according to claim 1, further including an LSI initialization and transformation component that maps the one or more case logs into one or more case log vectors based at least in part on one or more attribute values and the importance of each attribute, and maps the case log vectors into semantic case log vectors.

9. The computer based system according to claim 8, wherein the case log vectors are mapped into semantic case log vectors wherein d randomly sampled case logs are represented by a t×d matrix M, where each column vector is the vector corresponding to the j th case log, and wherein r is the rank of M, where the singular value decomposition (SVD) of M is M=T×S×D', where T, a t×r matrix, and D, a d×r matrix, have orthonormal column vectors and S is a diagonal matrix with singular values ranked in a descending order, and wherein $T_k, S_k, D_k$, are the resulted matrices by keeping only the first k columns of T, S, D, where k should be the number of semantic concepts in the case logs which produces a case log vector x that is folded into the k-dimensional semantic space by $x_k=x\times T_k$, which maps x, a t-dimensional case log vector, into $x_k$, a k-dimensional semantic case log vector.

10. The computer based system according to claim 9, further including a case clustering component that clusters the semantic case log vectors into groups based on their mutual correlations, wherein the number of case log vectors is n and the maximum number of case clusters is $K_{max}$, for K=1 to $K_{max}$, the clustering algorithm a) clusters n vectors into K clusters by using K-means algorithm with refined initial centroids, b) evaluates the performance of the K clusters by Bayesian Information Criterion (BIC) scores, and c) stores the above K cluster centroids and their evaluation score as a clustering scheme, wherein the clustering scheme with the best evaluation score is output.

11. The computer based system according to claim 1, further including a cluster characterization component that calculates the representative workflows for each cluster in the final clustering scheme generated by the case clustering component.

* * * * *